United States Patent
Russell et al.

(10) Patent No.: US 7,949,602 B1
(45) Date of Patent: May 24, 2011

(54) DISTRIBUTED IMAGE CAPTURE PROOF-OF-DEPOSIT SYSTEM AND METHOD OF OPERATING A DISTRIBUTED IMAGE CAPTURE PROOF-OF-DEPOSIT SYSTEM

(75) Inventors: Graham Russell, Cambridge (CA); John D. Cain, Kitchener (CA); Lianne C. Franklin, Waterloo (CA)

(73) Assignee: NCR Corporation, Duluth, GA (US)

( * ) Notice: Subject to any disclaimer, the term of this patent is extended or adjusted under 35 U.S.C. 154(b) by 3303 days.

(21) Appl. No.: 09/665,846

(22) Filed: Sep. 20, 2000

(51) Int. Cl.
G06Q 40/00 (2006.01)

(52) U.S. Cl. .......................................................... 705/42

(58) Field of Classification Search .............. 705/35–40, 705/42, 43, 44, 45
See application file for complete search history.

(56) References Cited

U.S. PATENT DOCUMENTS

| | | | |
|---|---|---|---|
| 5,159,548 A | 10/1992 | Caslavka | |
| 5,170,466 A | 12/1992 | Rogan et al. | |
| 5,819,236 A | 10/1998 | Josephson | |
| 5,825,506 A | 10/1998 | Bednar et al. | |
| 6,381,342 B2 * | 4/2002 | Foley | 382/101 |
| 6,863,214 B2 * | 3/2005 | Garner et al. | 235/379 |
| 2002/0073060 A1 * | 6/2002 | Geisel et al. | 707/1 |

FOREIGN PATENT DOCUMENTS

| | | |
|---|---|---|
| EP | 0 593 209 A2 | 4/1994 |
| EP | 0 981 113 A2 | 2/2000 |

* cited by examiner

*Primary Examiner* — Olabode Akintola
(74) *Attorney, Agent, or Firm* — Michael Chan

(57) ABSTRACT

A method of operating a distributed image capture proof-of-deposit system having a central processing site and a number of branches connected via a network with the central processing site comprises the steps of (a) capturing images of items at a branch without use of physical tracer items at the branch, and (b) transferring the images captured at the branch via the network to the central processing site. At least some images at the central processing site are processed using logical tracer items which have been inserted at the central processing site.

2 Claims, 7 Drawing Sheets

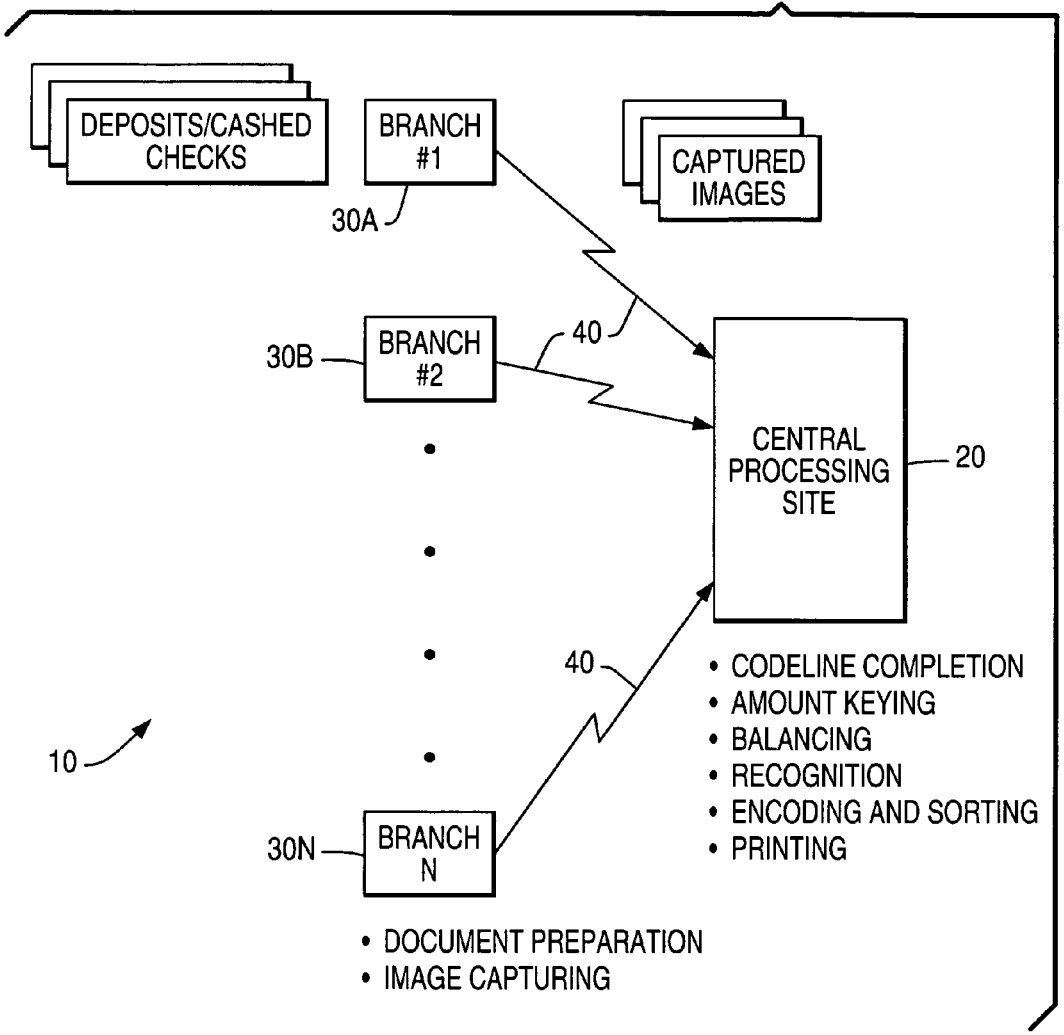
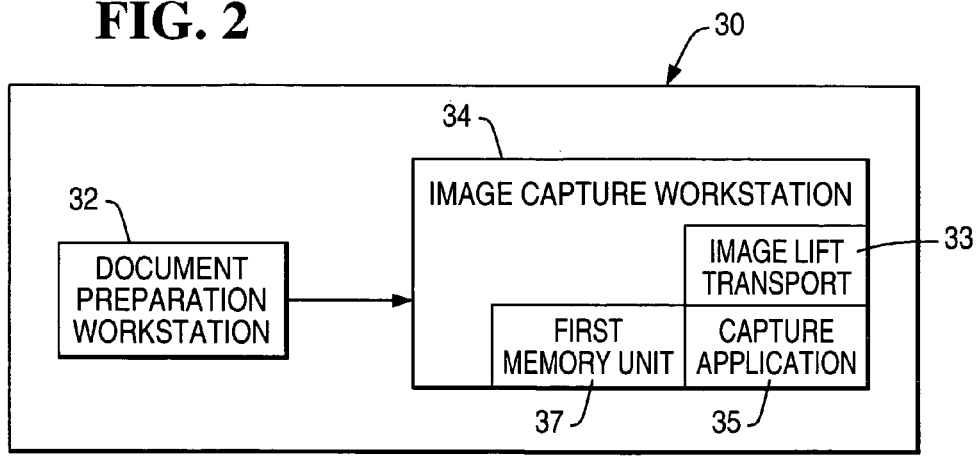

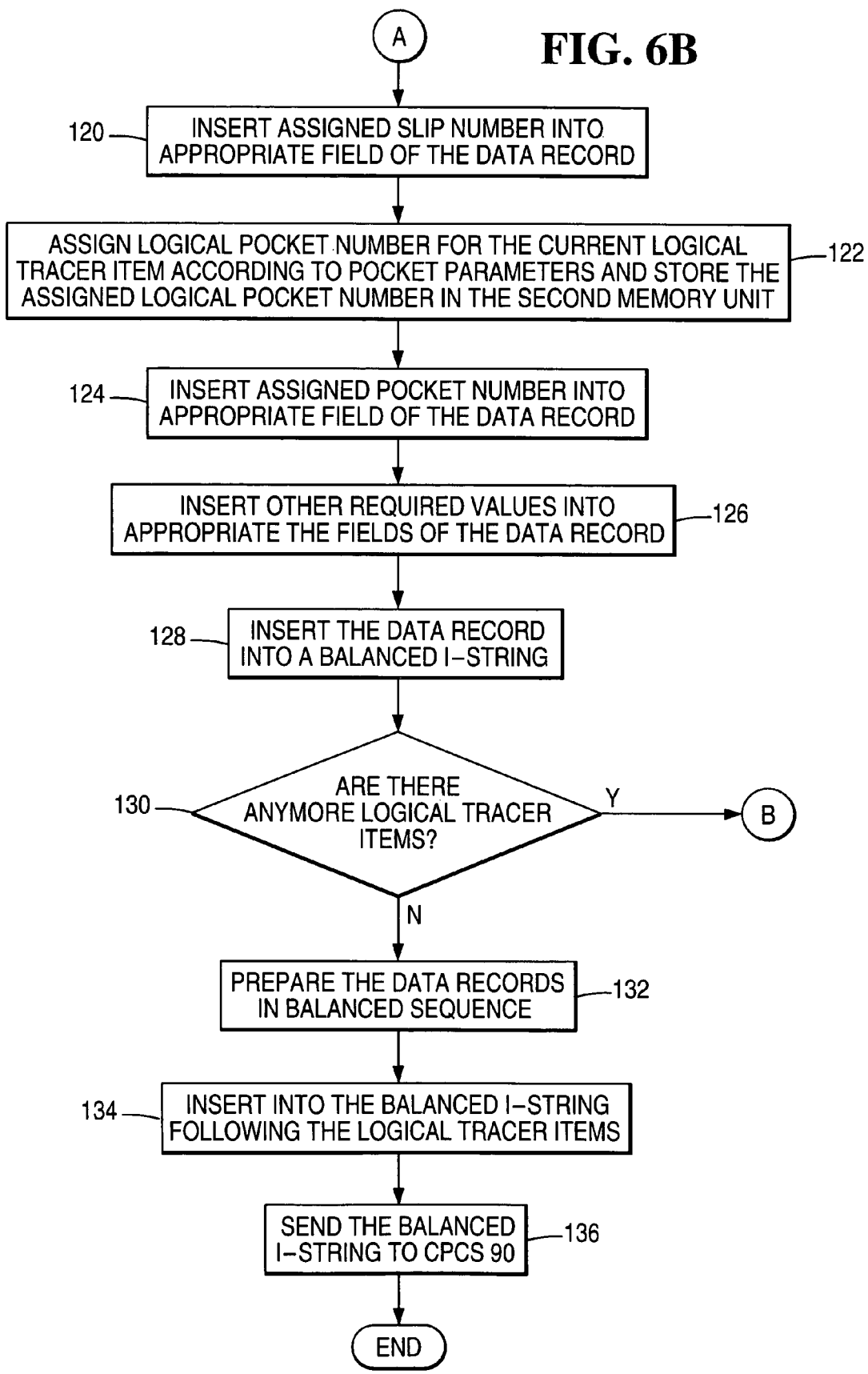

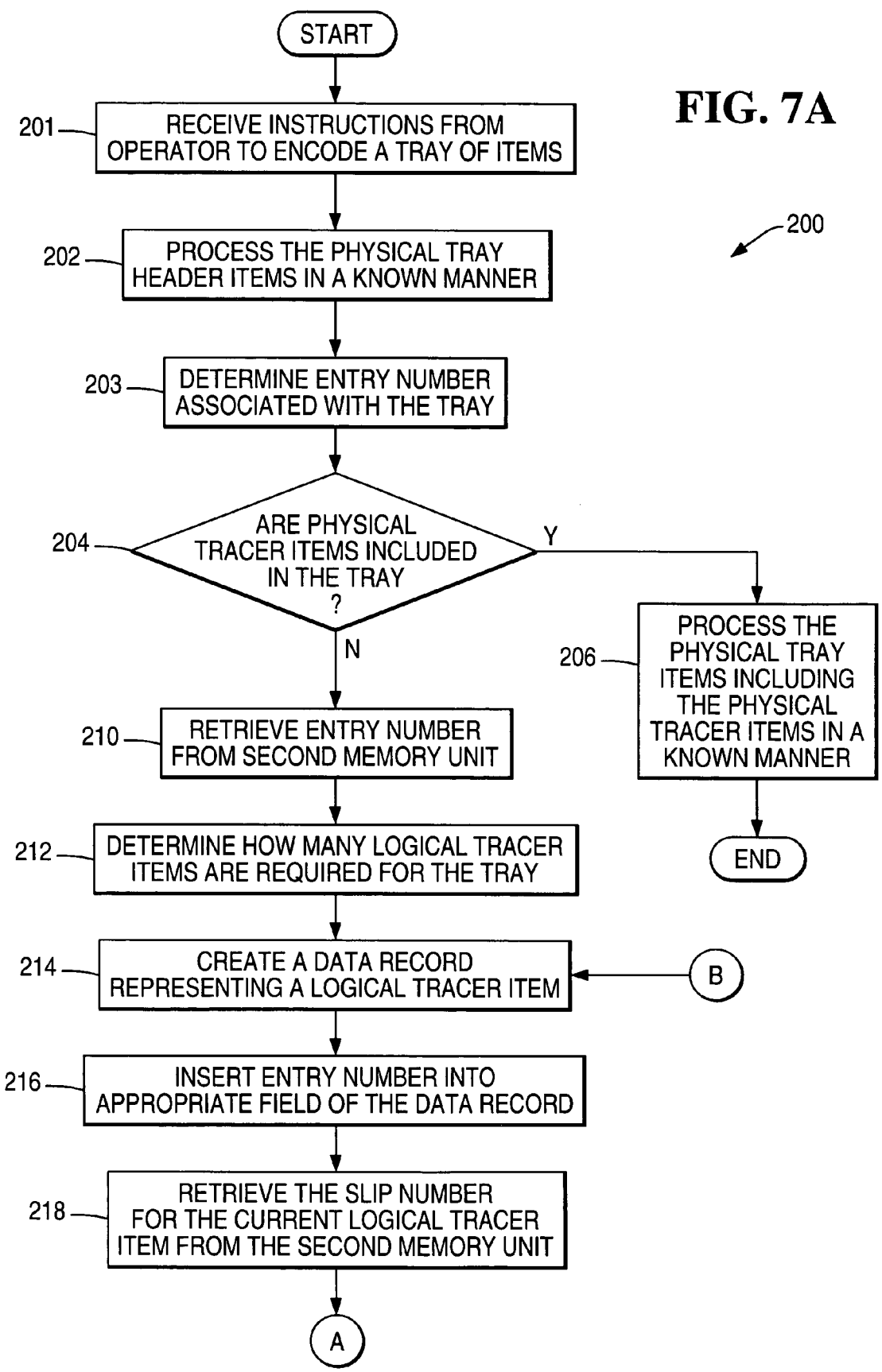

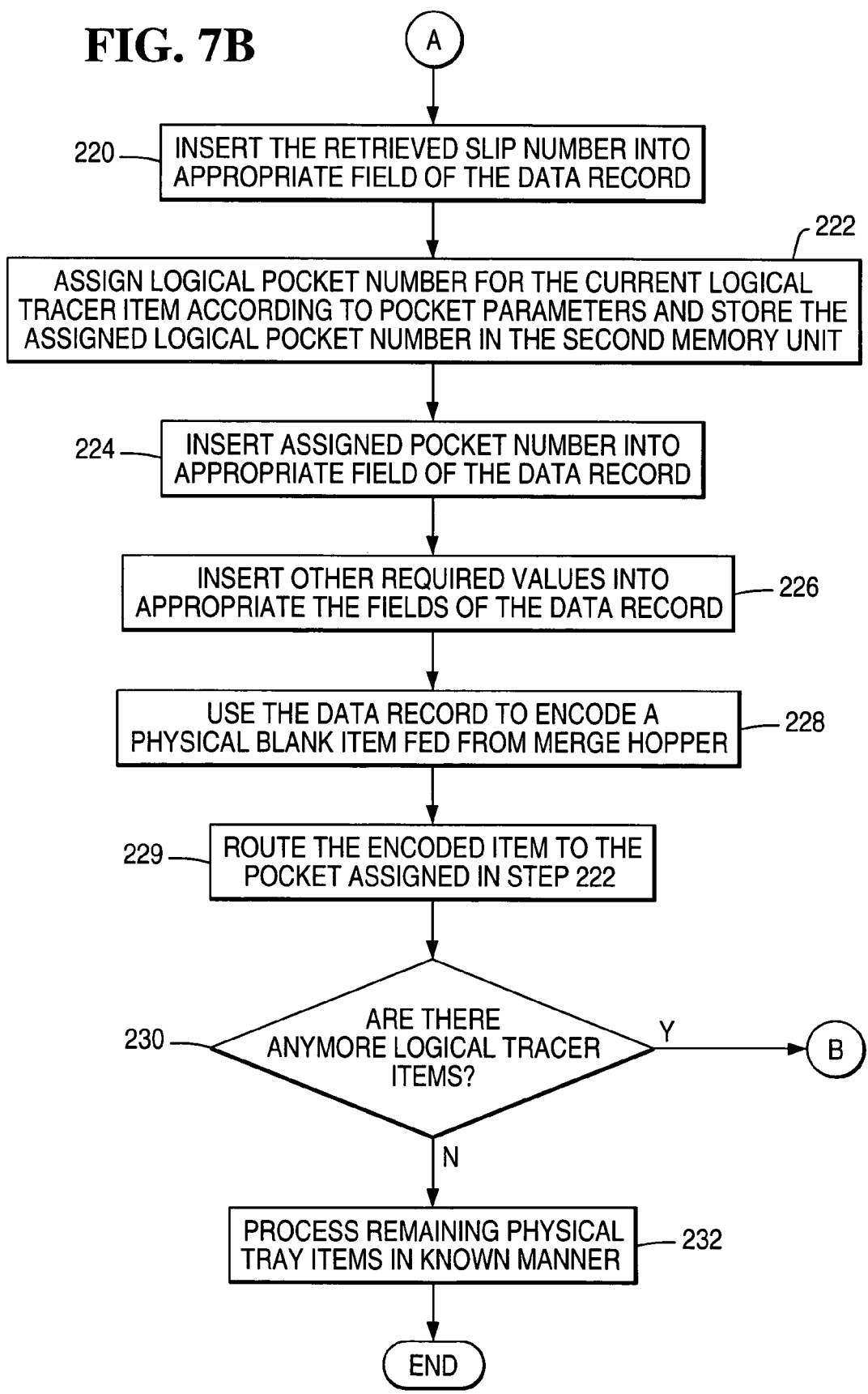

DISTRIBUTED IMAGE CAPTURE PROOF-OF-DEPOSIT SYSTEM AND METHOD OF OPERATING A DISTRIBUTED IMAGE CAPTURE PROOF-OF-DEPOSIT SYSTEM

BACKGROUND OF THE INVENTION

The present invention relates to image-based financial document processing systems, and is particularly directed to a distributed image capture proof-of-deposit system and a method of operating a distributed image capture proof-of-deposit system.

A typical distributed image capture proof-of-deposit system includes a number of different types of workstations located at a central check processing site and a number of different types of workstations located at each of a plurality of branches located remotely from the central site. Each branch may include a document preparation workstation and an image capture workstation. After documents are prepared for further processing at the document preparation workstation, a capture application of the image capture workstation is used to capture image data and MICR codeline data from the documents. The capture application uses the captured image data and codeline data to create units of work (i.e., batches of items) which is submitted via a data network to a workflow manager located at the central site. The central site may include a recognition workstation, a keying and balancing workstation, an encoding workstation, and a printing workstation. Each of the workstations at the central site polls the workflow manager for work to perform, and may also create units of work which are submitted back to the workflow manager. Image data and codeline data are processed at the different workstations at the central site.

After all of the batches of items from a particular branch have been balanced at the central site, an application at the central site sends a list of items within each balanced group of batches (known as an "entry") to downstream check processing software for further processing. As an example, the application at the central site may comprise NCR's ImageMark POD Balanced Item Export, a product of NCR Corporation, located in Dayton, Ohio. The further processing by the downstream check processing software at the central site includes, but is not limited to:

posting customer accounts
performing research and adjustments
creating bundle lists and cash letters for transit items which are sent out of the central site to another processing site, such as the Federal Reserve for example The downstream check processing software at the central site may comprise IBM's Check Processing Control System™ (CPCS). When CPCS is used, each entry must include a group of items known as "tracer" items. As is known, each entry processed at each branch needs to have a unique group of tracer items associated therewith. A typical unique group of tracer items includes about fifty items. Tracer items and their use are well known in the banking industry. As is known, each item of a unique group of tracer items is pre-encoded with a corresponding unique 4-digit entry number, and an incrementing 3-digit slip number, which usually starts at 001. Each unique group of tracer items is stored in a memory known as the CPCS Mass Data Set along with the items from the corresponding entry. The unique group of tracer items for each entry is used to identify the work throughout the CPCS processing workflow.

In order to leverage using CPCS in known distributed image capture proof-of-deposit systems, the capture application at the image capture workstation at each branch must follow the convention of capturing a unique group of tracer items at the beginning of each entry at the branch. The unique group of tracer items for a particular entry must be placed at the beginning of that entry. Accordingly, when batches of items associated with an entry are initially captured at the image capture workstation of a branch, the unique group of tracer items associated with that particular entry needs to be captured prior to the first batch of the entry.

Also, in order for the different workstations at the central site to properly process all entries received from all branches each day, no two groups of tracer items can be the same. One way to ensure that no two groups of tracer items are the same for any given day is to have the central site send out all of the different groups of tracer items to all of the branches for that day. A drawback in having the central site to do this on a daily basis is that the cost of operating the distributed image capture system is relatively high.

Another drawback is that it is difficult to ensure that each branch will use the correct unique group of tracer items on the correct day. For any given day, CPCS does not allow for entries being captured at multiple branches with duplicate tracer items, and does not accept receipt of a subsequent entry assigned the duplicate tracer items. The result is that the subsequent entry could not be processed by CPCS until the duplicate tracer items were changed to include a unique 4-digit entry number. Changing the tracer items in the subsequent entry would entail either (i) capturing a new group of tracer items, and replacing the previous group of duplicate tracer items within a database with the new group of tracer items, or (ii) repairing the codelines and field data captured on the original group of duplicate tracer items. Either option is usually difficult to perform, resulting in delay of the processing of the entry within CPCS. Logistically, it is difficult to ensure that each branch will use the correct unique group of tracer items each day.

SUMMARY OF THE INVENTION

In accordance with one aspect of the present invention, a method of operating an image-based item processing system comprises (a) determining whether physical tracer items are associated with an entry, and (b) associating a logical group of tracer items with the entry when the determination in (a) is negative.

In accordance with another aspect of the present invention, a method of operating a distributed image capture proof-of-deposit system having a central processing site and a number of branches connected via a network with the central processing site comprising the steps of (a) capturing images of items at a branch without use of physical tracer items at the branch, and (b) transferring the images captured at the branch via the network to the central processing site. At least some images at the central processing site are processed using logical tracer items which have been inserted at the central processing site.

In accordance with still another aspect of the present invention, a method of operating a distributed image capture proof-of-deposit system having a central processing site and a number of branches connected via a network with the central processing site comprises the steps of (a) capturing images of items at a branch, (b) transferring the images captured at the branch via the network to the central processing site, and (c) processing at least some images at the central processing site using logical tracer items which have been inserted at the central processing site.

In accordance with yet another aspect of the present invention, a method of operating an image capture proof-of-deposit system at a central processing site comprises the steps of (a) capturing images of items at the central processing site, and (b) processing at least some images at the central processing site using logical tracer items which have been inserted at the central processing site.

In accordance with another aspect of the present invention, a method of operating an encoding workstation of an image-based item processing system comprises the steps of (a) determining whether physical tracer items are included in a tray of items, and (b) associating a logical group of tracer items with the tray when the determination in step (a) is negative.

In accordance with another aspect of the present invention, an image-based item processing system comprises means for determining whether physical tracer items are associated with an entry, and means for associating a logical group of tracer items with the entry when the determination is negative.

In accordance with another aspect of the present invention, a distributed image capture proof-of-deposit system has a central processing site and a number of branches connected via a network with the central processing site. The system comprises means for capturing images of items at a branch without use of physical tracer items at the branch. Means is provided for transferring the images captured at the branch via the network to the central processing site.

In accordance with another aspect of the present invention, a distributed image capture proof-of-deposit system has a central processing site and a number of branches connected via a network with the central processing site. The system comprises means for capturing images of items at a branch. Means is provided for transferring the images captured at the branch via the network to the central processing site. Means is provided for processing at least some images at the central processing site using logical tracer items which have been inserted at the central processing site.

In accordance with another aspect of the present invention, an image capture proof-of-deposit system at a central processing site comprises means for capturing images of items at the central processing site, and means for processing at least some images at the central processing site using logical tracer items which have been inserted at the central processing site.

In accordance with another aspect of the present invention, an encoding workstation of an image-based item processing system comprises means for determining whether physical tracer items are included in a tray of items, and means for associating a logical group of tracer items with the tray when the determination is negative.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic block representation of a distributed image capture proof-of-deposit system embodying the present invention;

FIG. 2 is a schematic block representation of a branch in the distributed image capture proof-of-deposit system of FIG. 1;

FIG. 7 is flowchart depicting another process carried out in accordance with the present invention.

DETAILS OF THE INVENTION

Figure 3:
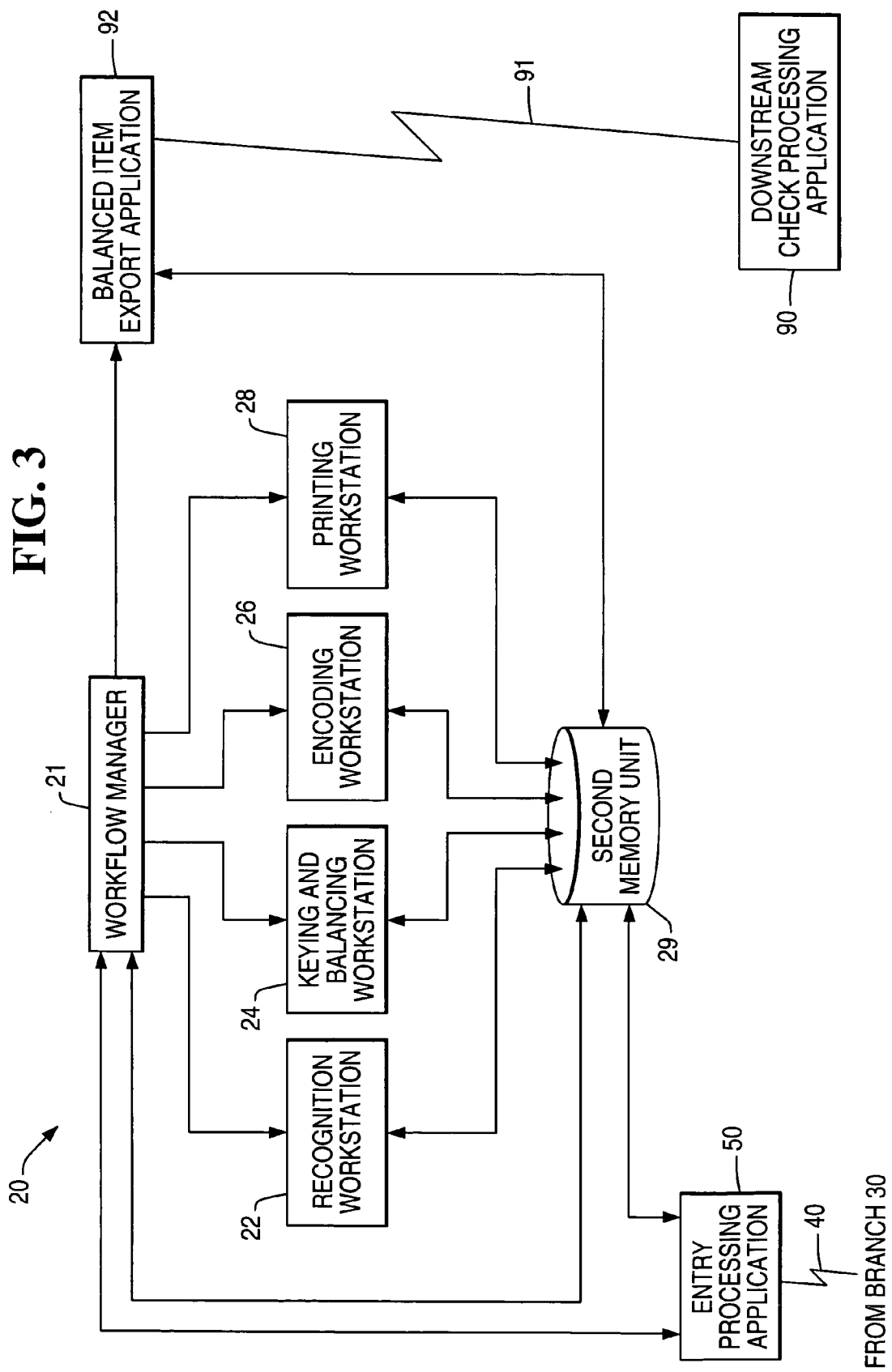
FIG. 3 is a schematic block representation of a central check processing site in the distributed image capture proof-of-deposit system of FIG. 1.

The present invention is directed to a distributed image capture proof-of-deposit system and method of operating a distributed image capture proof-of-deposit system. A distributed image capture proof-of-deposit system 10 embodying the present invention is illustrated in FIG. 1. The distributed image capture proof-of-deposit system 10 comprises a central check processing site 20 and a number of different branches 30A, 30B, ... 30N connected via a data network 40 with the central check processing site. Although there are "N" number of different branches shown in FIG. 1, it is to be understood that any number of branches could have been shown connected via the data network 40 with the central site 20. For simplicity, only one branch (referred to herein as "the branch 30") will be described in detail.

As shown in FIG. 2, the branch 30 includes a document preparation workstation 32 and an image capture workstation 34. At the document preparation workstation 32, transaction items including a number of debit items and a number of credit items associated with each transaction are prepared for further processing. Preparation of the debit and credit items may include removal of paper clips, staples, and the like, and stacking of the items in a particular order and/or direction in suitable trays. The trays containing the stacked items are then manually carted to the image capture workstation 34.

At the image capture workstation 34, the stacked items in the trays are manually removed from the trays and placed onto an image lift transport 33 of the image capture workstation 34. The transaction items on the image lift transport 33 are moved along a transport track in front of a front image lift camera and in front of a rear image lift camera (both not shown). A capture application 35 of the image capture workstation 34 controls the image lift cameras to optically scan each item as the item moves along the transport track in front of the cameras to produce front and rear electronic images of the item. The electronic images of the item are then stored in a first memory unit 37 of the image capture workstation 34 along with a unique sequence number.

Also, if the item being processed contains a MICR codeline, the MICR codeline is read as the item passes by a MICR reader (not shown). Alternatively, if the item being processed contains an OCR codeline, the OCR codeline is read as the item passes by an OCR reader. For simplicity, it is assumed that the item being processed contains a MICR codeline. The MICR codeline is associated with the front and rear electronic images and is also stored in the first memory unit 37. Suitable endorsement is printed onto the item as the item passes an endorser module (not shown). An endorsement status associated with the item is then stored in the first memory unit 37 along with the other information associated with the item.

After the images of an item are lifted by the image lift cameras and the electronic images, the sequence number, and the MICR codeline are captured, and the item is endorsed, the item is sorted into an appropriate sorter pocket (not shown) of the image capture workstation 34. Preferably, the image capture workstation 34 includes a table-top image-based item processing transport such as the Model 7731 Item Processing Transport, manufactured by NCR Corporation, located in Dayton, Ohio. The captured items are sorted in the transport pockets. Over the course of a period of time, such as a working day, the sorted items in each transport pocket are stacked in a respective tray. At the end of the period 115 of time, the trays are then physically transported (via courier, for example) to the central site 20. As each batch of items is captured during the period of time, the data stored in the first memory unit 37 is transmitted via the data network 40 to an entry processing application 50 (FIG. 3) at the central site 20 for further processing.

When the first batch of items is transmitted from the branch 30, the entry processing application 50 assigns a unique "entry number" for all of the batches received from that branch during the period of time. The assigned entry number is associated with an "entry" which is the list of all items contained within the group of batches for the branch 30. Thus, the image capture workstation 34 creates units of work and submits the created work via the data network 40 to the central site 20 for further processing.

As shown in FIG. 3, the central site 20 further includes a second memory unit 29 into which image data and codeline data obtained by the entry processing application 50 via the data network 40 from the branch 30 may be stored. More specifically, the second memory unit 29 is an item data and image memory which stores electronic images, MICR codelines, sequence numbers, endorsement status, encoder status, and image data associated with transaction items. The second memory unit 29 also stores the unique entry number which has been assigned for all of the batches received from the branch 30 during the period of time, as just described hereinabove.

Image data and codeline data are processed at the different workstations at the central site 20. The central site 20 includes a recognition workstation 22, a keying and balancing workstation 24, an encoding workstation 26, and a printing workstation 28. Each of the workstations 22, 24, 26, 28 polls the workflow manager 21 in a known manner for work to perform, and may also create units of work which is submitted back to the workflow manager 21.

The electronic images, the sequence numbers, and the MICR codelines of the items, which were earlier transmitted via the data network 40 from the branch 30 and now stored in the second memory unit 29 at the central site 20, are processed by the recognition workstation 26 and the keying and balancing workstation 18 in the manner described hereinbelow. At the recognition workstation 16, the electronic images of the items stored in the second memory unit 29 at the central site 20 are processed using known recognition techniques to determine the "amount" associated with each item. The amount of each item is then associated with the corresponding electronic images and the MICR codeline of the item and stored in the second memory unit 29. A one-to-one correspondence is thereby established between the electronic images, the sequence number, the MICR codeline, the endorsement status, and the encoder status of each item and the amount associated with that particular item. Accordingly, a database containing electronic images, the sequence number, the MICR codeline, the endorsement status, the encoder status, and the amount associated with each item is thereby created and stored in the second memory unit 29 at the central site 20.

It should be noted that some amounts will not be recognizable to the recognition workstation 22. Also, some amounts recognized at the recognition workstation 22 may have a low confidence level associated therewith. These items are identified and then processed further at the keying and balancing workstation 24 in a well known manner.

After all batches of items from the branch 30 have been received, and have been fully balanced at the central site 20, the physical items from the branch 30 are ready to be encoded. Once the trays of physical items have been received via courier at the central site 20 from the branch 30, they are encoded in a known manner at the encoder workstation 26. An encoder status associated with the item is stored in the second memory unit 29 located at the central site 20.

Also, after all of the batches of items from the branch 30 have been received, and fully balanced at the central site 20, a balanced item export application 92, such as NCR's ImageMark POD Balanced Item Export, creates a Balanced I-String in a manner as known. Balanced I-Strings and their creation are well known and, therefore, will not be described. Balanced I-Strings are sent from the balanced item export application 92 at the central site 20 to a downstream check processing application 90 via data network 91 for further processing. The downstream check processing application 90 may be at the central site 20 or at a separate remote location. Typically, the downstream check processing software 90 comprises IBM's Check Processing Control System™ (CPCS). The description and operation of CPCS 90 are well known in the art and, therefore, will not be described in detail.

Figure 4:
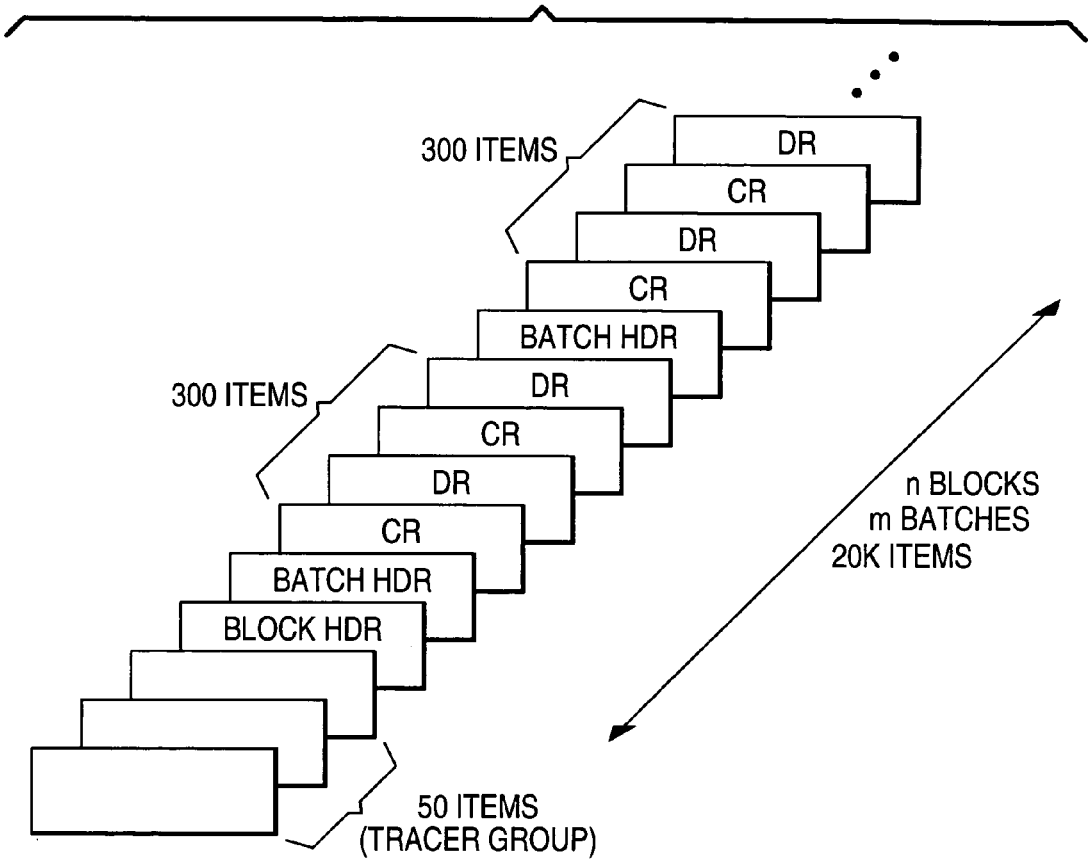
FIG. 4 is a diagram showing how a group of tracer items needs to be organized with an "entry" for further downstream processing at the central check processing site of FIG. 3.

As is known, when CPCS 90 is used, an "entry" (i.e., the list of all items contained within the balanced group of batches for the branch 30) must include a group of items known as "tracer" items, as shown in FIG. 4. Each entry needs to have a unique group of tracer items associated therewith. The unique group of tracer items for a particular entry must be placed at the beginning of that entry. No two groups of tracer items can be the same. More specifically, a unique group of tracer items needs to be associated with Balanced I-Strings before the Balanced I-Strings can be further processed by CPCS 90.

Figure 5:
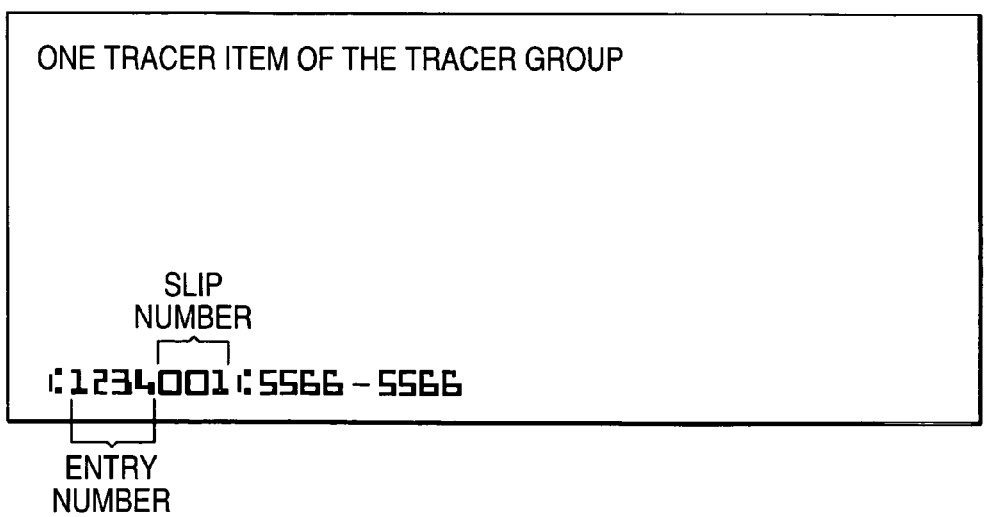
FIG. 5 is a diagram showing details of a single tracer item in the group of tracer items of FIG. 4.

A typical unique group of tracer items includes about fifty items. Tracer items and their use are well known in the banking industry. As is known and as shown in FIG. 5, each tracer item of the group of tracer items shown in FIG. 4 is pre-encoded with a corresponding unique 4-digit entry number, and an incrementing 3-digit slip number, which usually starts at 001. Each unique group of tracer items is stored in a memory known as the CPCS Mass Data Set along with the items from the corresponding entry. The unique group of tracer items for each entry is used to identify the work throughout the CPCS processing workflow.

Figure 6A:
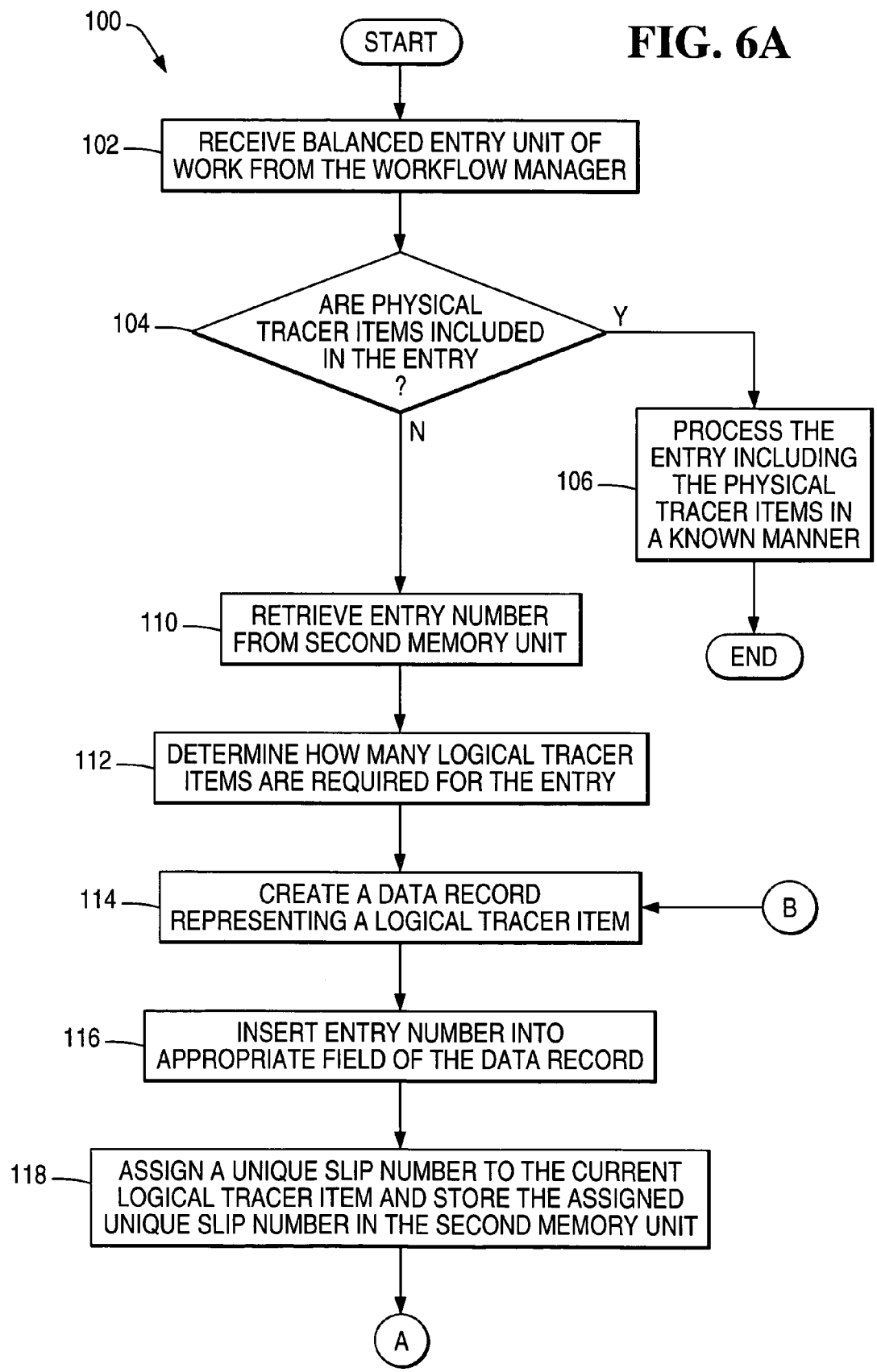
FIG. 6 is a flowchart depicting a process carried out in accordance with the present invention.

In accordance with the present invention, a unique logical group of tracer items rather than a unique physical group of tracer items is associated with each entry prior to the entry being provided to CPCS 90. FIG. 6 is a flowchart 100 which depicts the process which is initiated to associate a logical group of tracer items with an entry in place of associating the physical group of tracer items with the entry. In step 102, a balanced entry unit of work is received from the workflow manager 21. A determination is then made in step 104 as to whether physical tracer items are included in the entry received in step 102. If the determination in step 104 is affirmative, the process proceeds to step 106 in which the entry including the physical tracer items are processed in a known manner. However, if the determination in step 104 is negative, the process proceeds to step 110 to associate a logical group of tracer items with the entry in accordance with the present invention.

In step 110, the unique entry number which has been assigned to the entry is retrieved from the second memory unit 29. A determination is then made in step 112 as to how many logical tracer items are needed for this entry. Then, in step 114, a data record which represents a logical tracer item is created. As shown in step 116, the entry number assigned to the entry in step 110 is inserted into the appropriate field of the data record created in step 114. The process then proceeds to step 118.

In step 118, a unique slip number is assigned to the current logical tracer item. As shown in step 120, the slip number assigned to the current logical tracer item in step 118 is inserted into the appropriated field of the data record which was created in step 114. The process then proceeds to step 122 in which a logical pocket number is assigned to the current logical tracer item. This logical pocket number is determined based upon pocket parameters. As shown in step 124, the logical pocket number assigned in step 122 is inserted into the appropriate field of the data record which was created in step 114. In step 126, other required values are added to the appropriate fields of the data record which was created in step 114. The process then proceeds to step 128.

In step 128, the data record with all of its inserted values is inserted into a Balanced I-String. A determination is then made in step 130 as to whether there are any more logical tracer items to consider. If the determination in step 130 is affirmative, the process returns to step 114 to create another data record for representing the next logical tracer item. However, if the determination in step 130 is negative, the process proceeds to step 132 in which all of the created data records for this entry are placed in balanced sequence. Then, in step 134, the data records in balanced sequence are inserted into the Balanced I-String following the logical tracer items. The Balanced I-String with the inserted data records in balanced sequence is then sent to the downstream check processing application 90 (i.e., CPCS), as shown in step 136.

After a corresponding logical group of tracer items has been associated with the entry as just described hereinabove, the balanced item export application 92 sends the entry along with its associated logical group of tracer items to CPCS 90 for further processing.

The further processing by CPCS 90 includes, but is not limited to:
  posting customer accounts
  performing research and adjustments
  creating bundle lists and cash letters for transit items which are sent out of the central site to another processing site, such as the Federal Reserve for example A number of advantages result by operating a distributed image capture proof-of-deposit system in accordance with the present invention. One advantage is that personnel at each branch do not need to physically run a unique deck of tracer items at the beginning of each entry. This results in cost savings. Accordingly, unique decks of tracer items do not need to be sent by courier to the branches. Another advantage is that physical decks of tracer items do not need to be manually added to physical trays of items when the physical trays of items arrive at the central processing site from the branches. Again, this results in cost savings. Yet another advantage is that there is a relatively higher level of confidence that no two groups of tracer items will be the same for any given day.

Although the foregoing describes a process which is used to associate a logical group of tracer items with Balanced I-Strings of an entry from the balanced item export application 92, it is contemplated that the same process may be used to associate a logical group of tracer items with Sub-Pass I-Strings after the balanced entry has been encoded at the encoding workstation 26. Sub-Pass I-Strings and their creation are well known and, therefore, will not be described.

Also, although the foregoing describes insertion of logical tracer items at the central site 20 by the balanced item export application 92 to allow for further downstream processing, it is contemplated that logical tracer items may be inserted at the encoding workstation 26 to allow for further downstream processing. FIG. 7 is a flowchart 200 which depicts the process which is initiated to associate a logical group of tracer items with a tray in place of associating the physical group of tracer items with the tray. In step 201, instructions to encode a tray of items is received from an operator. In step 202, the physical tray header items are processed in a known manner. It should be noted that a tray of items is a subset of an original group of physical items which were captured as an entry. Accordingly, an entry includes a number (usually more than one) of trays.

As shown in step 203, the entry number associated with the tray is determined. A determination is then made in step 204 as to whether physical tracer items are included in the tray received in step 202. If the determination in step 204 is affirmative, the process proceeds to step 206 in which the physical tray items including the physical tracer items are processed in a known manner. However, if the determination in step 204 is negative, the process proceeds to step 210 to associate a logical group of tracer items with the tray in accordance with the present invention.

In step 210, the unique entry number which has been assigned to the entry associated with the tray is retrieved from the second memory unit 29. A determination is then made in step 212 as to how many logical tracer items are needed for this tray. Then, in step 214, a data record which represents a logical tracer item is created. As shown in step 216, the entry number assigned to the tray in step 210 is inserted into the appropriate field of the data record created in step 214. The process then proceeds to step 218.

In step 218, the slip number which was assigned to the current logical tracer item (as in step 118 of FIG. 6) is retrieved from the second memory unit 29. This assigned slip number matches the slip number used for the corresponding logical tracer item created by the balanced item export application 92. As shown in step 220, the retrieved slip number associated with the current logical tracer item is inserted into the appropriate field of the data record which was created in step 214. The process then proceeds to step 222 in which a logical pocket number is assigned to the current logical tracer item and is stored in the second memory unit 29. This logical pocket number is determined based upon pocket parameters. As shown in step 224, the logical pocket number assigned in step 222 is inserted into the appropriate field of the data record which was created in step 214. In step 226, other required values are added to the appropriate fields of the data record which was created in step 214. The process then proceeds to step 228.

In step 228, the data record with all of its inserted values is used to encode a physical blank item fed from a merge hopper. Then, in step 229, the encoded item is routed to the pocket which was assigned in step 222. A determination is then made in step 230 as to whether there are any more logical tracer items to consider. If the determination in step 230 is affirmative, the process returns to step 214 to create another data record for representing the next logical tracer item. However, if the determination in step 230 is negative, the process proceeds to step 232 in which the remaining physical tray items are processed in known manner.

Although the above describes a distributed image capture environment having the image capture workstation 34 at the branch 30 and the encoding workstation 26 at the central site 20, it is contemplated that logical tracer items may be used in any type of item processing environment including a non-distributed image capture environment.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of operating a distributed image capture proof-of-deposit system having a central processing site and a number of branches connected via a network with the central processing site, the method comprising:

capturing at a branch images of physical document items without use of a group of physical tracer document items;

transferring the captured images of physical document items from the branch via the network to the central processing site;

receiving at the central processing site the images transferred from the branch;

assigning a unique entry number to all batches of document items received from the branch during a predetermined period of time;

creating a group of non-physical, logical tracer document items based upon the assigned unique entry number; and associating the group of non-physical, logical tracer document items with the batches of document items received from the branch during the predetermined period of time; and processing the batches of document items received from the branch during the predetermined period of time by using the group of non-physical, logical tracer document items which has been associated with the batches of document items received from the branch during the predetermined period of time.

2. A method of operating an encoding workstation of an image based item processing system to process physical document items which are contained in a number of document trays without using a group of physical tracer document items in the document trays, the method comprising the steps of:

determining whether a group of physical tracer document items is included in a tray of physical document items;

associating a unique group of non-physical, logical tracer document items with the tray of physical document items when a determination is made that a group of physical tracer document items is not included in a tray of physical document items;

assigning a logical pocket number to each non-physical, logical tracer document item in the unique group of non-physical, logical tracer document items;

for each non-physical, logical tracer document item, encoding a physical blank document item with information associated with the particular non-physical, logical tracer document item; and for each encoded item, routing the encoded physical document item to a physical pocket which has been assigned the logical pocket number.

* * * * *